United States Patent [19]
Phillipson

[11] 3,876,320
[45] Apr. 8, 1975

[54] FISHING ROD HANDLE JOINT

[75] Inventor: Phillip William Phillipson, Denver, Colo.

[73] Assignee: Minnesota Mining and Manufacturing Company, St. Paul, Minn.

[22] Filed: Aug. 3, 1973

[21] Appl. No.: 385,586

[52] U.S. Cl. ................ 403/370; 43/23; 403/372; 403/361
[51] Int. Cl. .................... F16b 7/04; B25g 3/10
[58] Field of Search ........... 403/370, 301, 302, 306, 403/313, 360, 361, 367, 368, 371, 372, 261, 376; 43/23

[56] References Cited
UNITED STATES PATENTS
| | | | |
|---|---|---|---|
| 2,702,192 | 2/1955 | Warth | 403/371 X |
| 2,756,531 | 7/1956 | Hollenshead | 43/23 UX |
| 2,937,041 | 5/1960 | Miller et al. | 403/301 |
| 3,269,049 | 8/1966 | Emmons | 43/23 |

FOREIGN PATENTS OR APPLICATIONS
| | | | |
|---|---|---|---|
| 1,261,974 | 4/1961 | France | 43/23 |

Primary Examiner—Richard J. Scanlan, Jr.
Assistant Examiner—Wayne L. Shedd
Attorney, Agent, or Firm—Alexander, Sell, Steldt & DeLaHunt

[57] ABSTRACT

A fishing rod in which the butt of a rod fits into an axial cavity in the end of the handle and is locked into the handle by threading of a collet onto the handle over the rod and handle joint. The butt of the rod is formed with a support cylinder extending axially from the rod handle joint and the collet is generally coextensive therewith to provide support for the rod spaced from the area in which it is locked to the handle.

2 Claims, 2 Drawing Figures

FISHING ROD HANDLE JOINT

FIELD OF THE INVENTION

The present invention relates to a fishing rod in which the butt of a rod is clamped into a cavity in the end of the handle.

BACKGROUND OF THE INVENTION

It has long been recognized that fishing rods should have high strength to weight ratios without abrupt changes of properties along their length. This has been recognized as best being obtained by the use of rods wherein the butt end of the rod locks into the end of the handle.

Generally, fishing rods having a one-piece rod utilize a chuck arrangement at the end of the handle in which threading of the collet of the chuck causes the butt end of the rod to be captured in the chuck. However, it has been found that a high stress occurs at the joint between the chuck and the butt of the rod and that in use the chuck often becomes loosened and the rod comes out of the handle. More seriously it has also been found that in heavy use the rod may break at its joint with the handle because of the high stress involved.

SUMMARY OF THE INVENTION

The present invention provides a fishing rod comprising a rod terminating at its butt end in a metal ferrule having a cylindrical locking end and a larger diameter support cylinder adjacent the locking end, and a handle formed at its forward end with an axially extending cavity for receipt of the locking end of the rod. The exterior of the handle is threaded at its forward end. A metal collet is formed with an internal diameter equal to that of the support cylinder of the rod extending along an axial length from one end thereof generally equal to the length of the support cylinder. The collet is internally threaded at the opposite end to mate with the threaded end of the handle, and the locking end of the rod is locked into the cavity of the handle upon threading of the collet onto the handle.

DRAWING

In the drawing:

FIG. 1 is a longitudinal view partially in section of a fishing rod constructed in accordance with the present invention illustrated in use with a bait casting reel thereon; and FIG. 2 is an exploded longitudinal view partially in section of the parts of the fishing rod of FIG. 1 at the juncture between the rod and the handle.

DESCRIPTION OF THE PREFERRED EMBODIMENT

Figure 1:
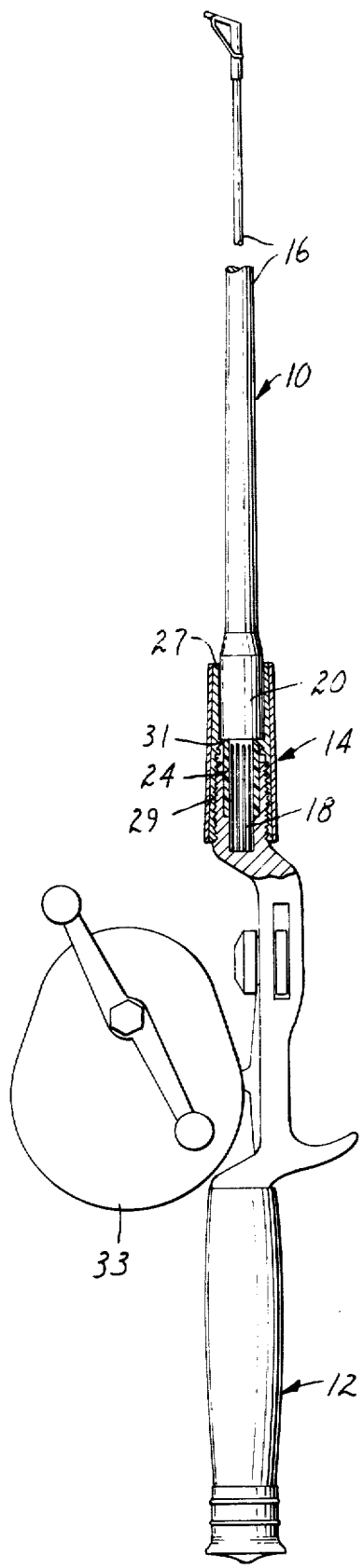
Figure 2:
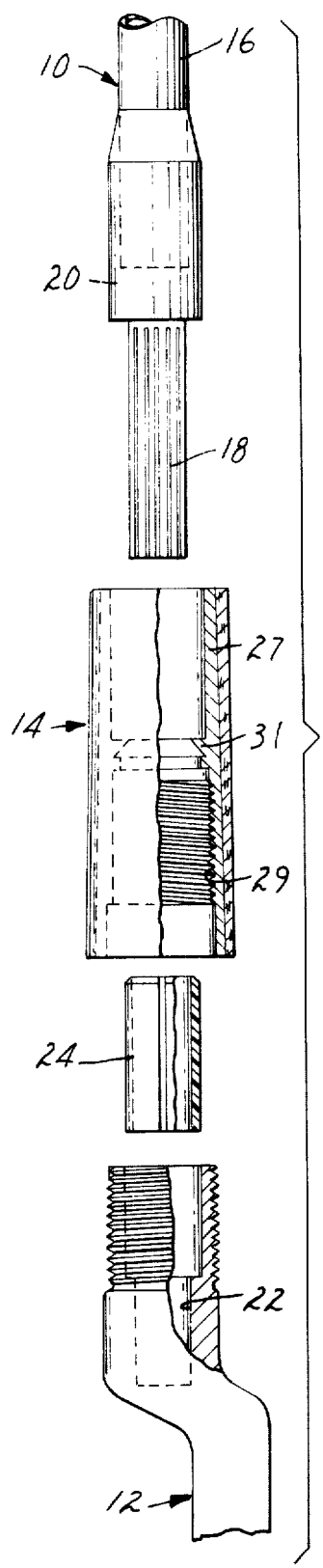

The fishing rod of the present invention comprises a rod 10, a handle 12 and a collet 14.

The rod 10 comprises a hollow one-piece fiber reinforced polymeric rod 16 terminating at its butt end in a metal ferrule having a knurled cylindrical locking end 18 and a larger diameter support cylinder 20 adjacent the locking end. The rod 16 is, for example, made of Scotchply available from the Minnesota Mining and Manufacturing Company with offices at Saint Paul, Minnesota and presently utilized in rods sold under the Phillipson brand. It is adhesively bonded into the metal butt ferrule coaxially therewith.

The handle 12 is metal with a cork grip and it is formed at its forward end with an axially extending cavity 22 for receipt of the locking end 18 of the rod 10. The cavity 22 is countersunk to receive a split cylindrical bushing 24 in the cavity 22 around the locking end 18 of the rod 10. The bushing 24 is a fiberglass reinforced plastic and it is split along its length so that it might be more easily compressed around the knurled locking end 18 of the rod. The bushing has an axial length sufficient to extend out of the cavity 22 beyond the end of the handle 12 to aid in locking the rod to the handle as will be hereinafter described.

The collet 14 comprises a metal body covered with cork. At its forward support end 27 is has an internal diameter equal to that of the external diameter of the support cylinder 20 of the rod 10 extending an axial length generally equal to the length of the support cylinder. At its opposite end the collet 14 is formed with internal threads 29 complementary to the threads on the exterior of the handle 12. The collet 14 is also formed internally with a beveled ring 31 between the forward support end 27 and the rearward threaded end. The opening in the beveled ring 31 has a diameter only slightly larger than that of the knurled locking end 18 of the rod 10 so that when the threads 29 on the collet 14 are mated with those on the handle 12 and the collet is turned onto the handle through a few turns, the end of the bushing 24 is engaged by the beveled ring 31. Further turning of the collet 14 onto the handle 12 then causes the beveled ring 31 to compress the end of the bushing 24 around the knurled locking end 18 of the rod 10 to firmly retain the rod 10 and the handle 12 together.

In use, the bushing 24 is inserted into the countersunk portion of the cavity 22 in the end of the handle 12 and the collet 14 is partially threaded onto the end of the handle 12. In this condition the rod is broken down for ease of transportation and storage.

When it is desired to use the rod, the knurled locking end 18 of the rod 10 is inserted into the collet 14 and down into the cavity 22 in the handle 12 with the end of the support cylinder 20 firmly against the top of the beveled ring 31. With the rod held to maintain the support cylinder 20 against the beveled ring 31 the collet 14 is turned onto the handle 12 until the beveled ring 31 compresses the upper end of the bushing 24 onto the knurled locking end 18 of the rod 10. The rod 10 and handle 12 are then firmly locked together.

Upon mounting a reel 33 on the handle 12 in a conventional manner and using the appropriate line and lures the fisherman is ready to go after the hard-fighting bass or even the powerful muskie, depending on the weight and action of the polymeric rod 16. The rod 10 is firmly locked to the handle 12 at the knurled end 18 of the rod and the rod is supported by the collet 14 along the support cylinder 20. The stress developed in the rod when playing a fish is thus primarily taken up by the collet 14 along the support cylinder 20 thereby preventing the stresses from working the knurled locking end 18 out of its locked position. At the same time the stress is distributed over the length of the support cylinder 20 to prevent a stress buildup that could break the rod 10 when playing a big one or when hooked on a snag.

I claim:

1. A fishing rod comprising:
    a rod terminating at its butt end in a metal ferrule having a terminal cylindrical locking end and a larger diameter support cylinder adjacent the locking end, a handle formed at its forward end with an axially extending cavity for receipt of the locking end of said rod, the exterior of said handle being threaded at said forward end, a metal collet having an internal diameter equal to that of the external diameter of said support cylinder of said rod extending along an axial length from one end thereof generally equal to the length of said support cylinder and being internally threaded at the opposite end to mate with the threaded end of said handle, and means for locking said locking end of said rod into said cavity in said handle upon threading of said collet onto said handle.

2. The fishing rod of claim 1 wherein said means for locking said locking end of said rod into said cavity in said handle comprises a split cylindrical bushing formed to fit into said cavity around said locking end of said rod and having a length sufficient to extend out of said cavity beyond the end of said handle, and a ring within said collet formed to engage the end of said bushing and compress it around said locking end of said rod upon threading of said collet onto said handle.

* * * * *